(12) United States Patent
Kaufman

(10) Patent No.: US 7,798,740 B2
(45) Date of Patent: Sep. 21, 2010

(54) FIXING ELEMENT FOR FIXING CABINET PANELS TO ONE ANOTHER

(75) Inventor: Cornelis Pieter Kaufman, Kudelstaart (NL)

(73) Assignee: Van Zandbergen Industrieel Plaatwerk B.V., Boesingheliede (NL)

( * ) Notice: Subject to any disclaimer, the term of this patent is extended or adjusted under 35 U.S.C. 154(b) by 260 days.

(21) Appl. No.: 11/721,486

(22) PCT Filed: Dec. 13, 2005

(86) PCT No.: PCT/NL2005/050073

§ 371 (c)(1),
(2), (4) Date: Mar. 24, 2008

(87) PCT Pub. No.: WO2006/083164

PCT Pub. Date: Aug. 10, 2006

(65) Prior Publication Data

US 2008/0193212 A1 Aug. 14, 2008

(30) Foreign Application Priority Data

Dec. 13, 2004 (NL) .................................... 1027731

(51) Int. Cl.
*F16B 12/36* (2006.01)
(52) U.S. Cl. .................... 403/408.1; 403/292; 403/256; 403/DIG. 11; 312/265.5; 211/189; 24/292
(58) Field of Classification Search ................. 403/201, 403/231, 252, 256, 292, 297, 326, 329, 408.1, 403/DIG. 11, DIG. 13; 312/257.1, 263, 265.5, 312/111; 211/186, 189; 24/292, 293, 297
See application file for complete search history.

(56) References Cited

U.S. PATENT DOCUMENTS

| 4,422,222 | A | | 12/1983 | Notoya | |
|---|---|---|---|---|---|
| 4,821,481 | A | | 4/1989 | Woodman | |
| 5,673,985 | A | * | 10/1997 | Mitchell | .................. 312/265.3 |
| 5,758,987 | A | | 6/1998 | Frame et al. | |
| 5,992,953 | A | * | 11/1999 | Rabinovitz | .................. 312/111 |
| 6,042,296 | A | * | 3/2000 | Wittig et al. | ................. 403/298 |
| 6,305,892 | B1 | * | 10/2001 | Qiao | .......................... 411/508 |
| 6,368,009 | B1 | * | 4/2002 | Noda | ......................... 403/329 |
| 6,672,793 | B2 | * | 1/2004 | Shyr | .......................... 403/324 |
| 2004/0208728 | A1 | | 10/2004 | Fattori et al. | |

* cited by examiner

*Primary Examiner*—Michael P Ferguson
(74) *Attorney, Agent, or Firm*—Sughrue Mion, PLLC

(57) ABSTRACT

Fixing element for fixing a first and second panel to one another, which fixing element is provided on both sides with first and second insertion ends facing away from one another for insertion in a complementary cut-out in each panel, comprising at least a first snap-fit member on the first insertion end and at least one associated first bearing surface facing said snap-fit member for clamping the first panel between them, as well as at least a second snap-fit member on the second insertion end and at least one associated second bearing surface facing said snap-fit member for clamping the second panel between them. The bearing surfaces lie in the same plane in different positions, so that panels that have been fixed to one another with the fixing element are directly in contact with one another.

8 Claims, 4 Drawing Sheets

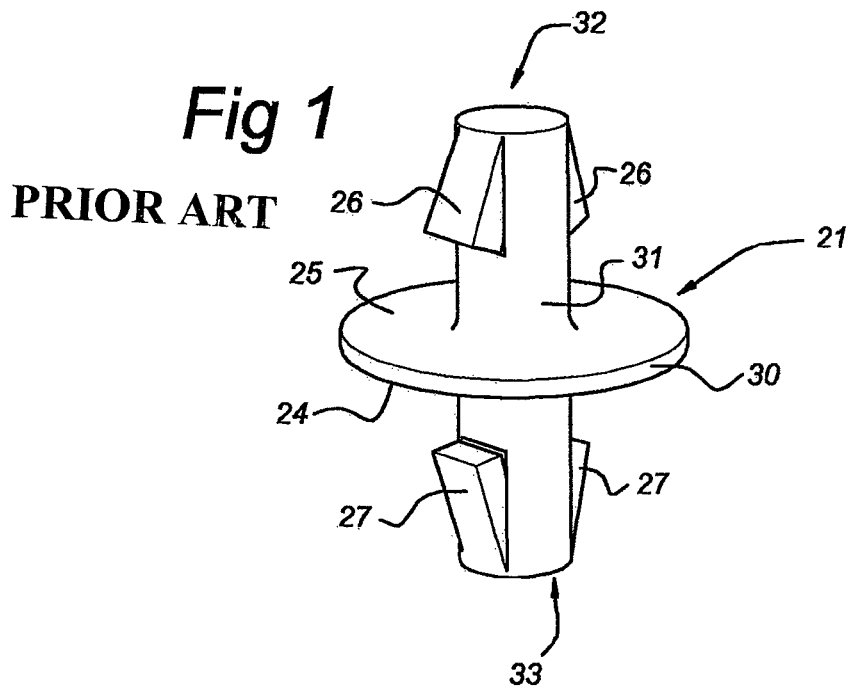
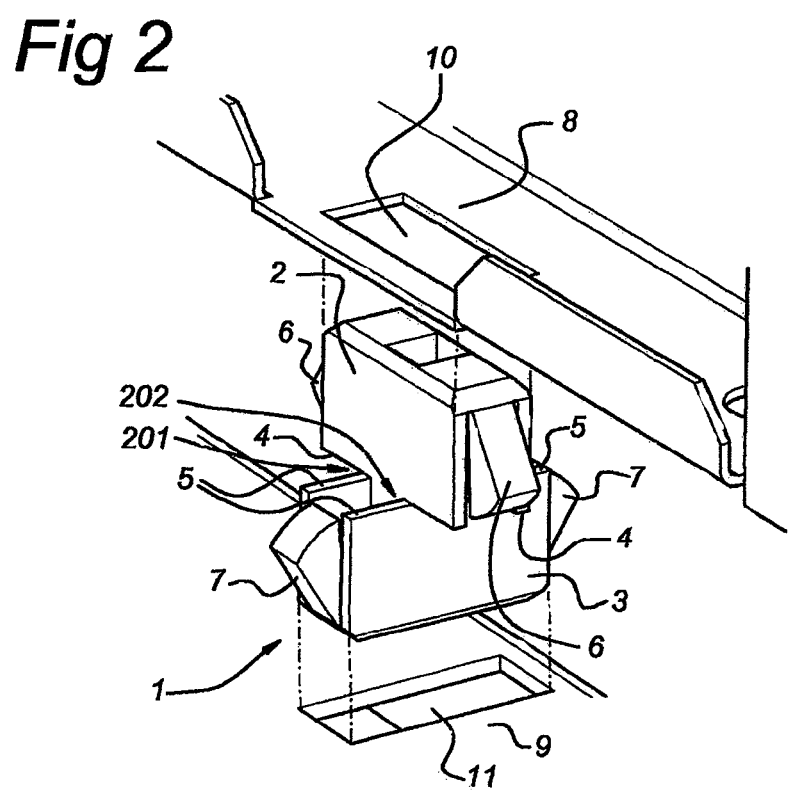

FIXING ELEMENT FOR FIXING CABINET PANELS TO ONE ANOTHER

BACKGROUND OF THE INVENTION

The invention relates to a fixing element for fixing a first and second panel to one another, said fixing element being provided on both sides with first and second insertion ends facing away from one another for insertion in a complementary cut-out in each panel, comprising at least a first snap-fit member on the first insertion end and at least one associated first bearing surface facing said snap-fit member for clamping the first panel therebetween, as well as at least a second snap-fit member on the second insertion end and at least one associated second bearing surface facing said snap-fit member for clamping the second panel therebetween.

Such a fixing element is, for example, used with cabinets built up of panels that are supplied to the consumer as a pack in unassembled state and thereafter can be assembled by the consumer. This enables the producer to keep the assembly and transport costs down. However, the prerequisite is that the consumer is able to assemble the cabinet in a simple manner. An aid to this end is the fixing element described above. One insertion end of the element is pushed into a cut-out in a panel and clicked into place, after which it is secured with respect to the panel in the direction of insertion and the other insertion end protrudes from the panel. Thereafter a subsequent panel with a cut-out can simply be clicked into place over this protruding insertion end.

A fixing element of this type is known. The known fixing element comprises a cylindrical part with a snap-fit member at both ends and has a flange between these ends, each snap-fit member interacting with the respective face of the flange facing the snap-fit member for clamping a respective panel therebetween.

A disadvantage of the known fixing element is that the flange is located between the panels fixed to one another, as a result of which the panels do not adjoin each other and therefore a gap remains between them. This is not only undesirable from the point of view of aesthetics but also in particular if the panels are used to construct a cabinet, because dust can penetrate through the gaps into the interior of the cabinet and can reach the items located therein.

SUMMARY OF THE INVENTION

The aim of the present invention is to provide a fixing element for fixing panels to one another in such a way that these, at least at the location of the fixing, are directly in contact with one another.

This aim is realised by providing the fixing element with bearing surfaces that lie in the same plane in different positions. Such an embodiment of the fixing element makes it possible for the panels fixed to one another with this to be directly in contact with one another, because in the assembled state no part of the fixing element is located between the panels, whilst after clicking into a cut-out in a panel in the direction of insertion the fixing element is nevertheless secured with respect to that panel. The shape of the cut-outs in the respective panels is in this case matched to the shape of the respective insertion ends of the fixing element.

In a preferred embodiment the insertion ends each comprise a box-shaped part with a bearing side, which box-shaped parts are joined to one another at said bearing sides and are rotated 90° relative to one another about an axis oriented in the direction of insertion, so that the bearing side of each box-shaped part has a joined and a free portion, wherein the free portion of the bearing side of a first box-shaped part forms the bearing surface that interacts with a snap-fit member on a second box-shaped part for clamping a panel between them and the free portion of the bearing side of the second box-shaped part forms the bearing surface that interacts with a snap-fit member on the first box-shaped part for clamping a panel between them.

Such an embodiment makes a robust panel joint possible and has as a further advantage that with a construction using such a fixing element fixing of a panel in an incorrect position can be prevented by making the orientation of respective panel cut-outs of a panel joint differ from that of another panel joint. Such an embodiment provides for further simplification of the assembly operations.

Preferably the fixing element is an injection-moulded one-piece moulded part made of plastic, such as, for example, polyamide.

The invention also relates to a cabinet comprising panels that have been fixed by means of at least one fixing element according to the invention. Such a cabinet comprises, for example, a base panel with a first set of cut-outs on a first side for accommodating a first set of fixing elements and a second set of cut-outs on an opposing side for accommodating a second set of fixing elements, as well as a first side panel with an edge folded over at a right angle with cut-outs for accommodating the first set of fixing elements therein and a second side panel with an edge folded over at a right angle with cut-outs for accommodating the second set of fixing elements therein.

BRIEF DESCRIPTION OF THE DRAWINGS

The invention will now be explained on the basis of an illustrative embodiment, with reference to the following figures:

FIG. 1 is a perspective view of a fixing element according to the prior art,

FIG. 2 is a perspective view of a fixing element according to the invention, with panels partially shown.

DETAILED DESCRIPTION OF THE INVENTION

Figure 3:
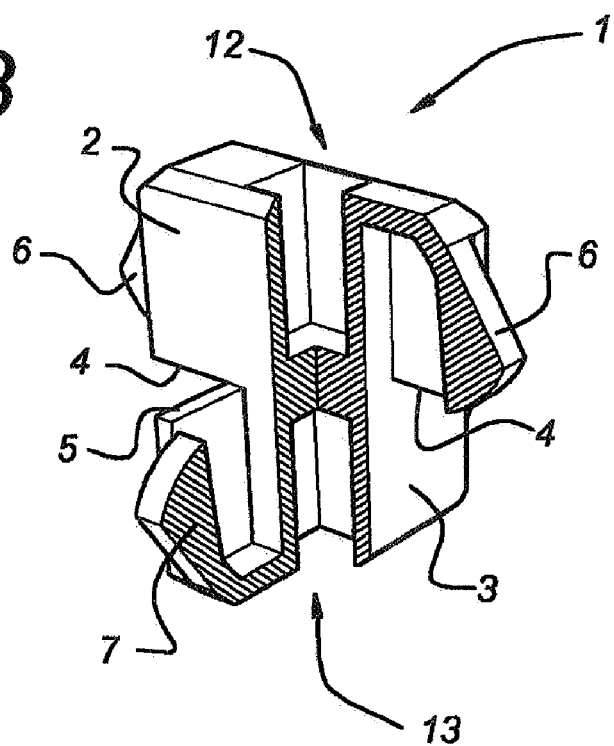
FIG. 3 is a perspective view of the fixing element in FIG. 2, shown partially exposed.

For the purposes of illustration, a fixing element for panels according to the prior art is shown in FIG. 1. This fixing element has a cylindrical part 31 with a first insertion end 32 provided with snap-fit members 26 and a second insertion end 33 provided with snap-fit members 27. Between these insertion ends there is a flange 30, with bearing surfaces 24, 25. On assembly, one insertion end 32, 33 is pushed into a cut-out in a panel having essentially the same diameter as the cylindrical part. Once the panel has passed the snap-fit member 26, 27 concerned, it is secured between the snap-fit member 26, 27 and the bearing surface 25, 24 of the flange 30 facing this snap-fit member. The distance between a respective snap-fit member and bearing surface is in this case obviously matched to the thickness of the panel to be securely clamped for producing a joint with essentially no play. Clearly, after assembly flange 30 is located between the panels fixed using this element.

FIG. 2 shows the fixing element according to the invention, the insertion ends 12, 13 each comprising a box-shaped part 2, 3 having a bearing side, which parts are joined to one another at the bearing sides and are rotated 90° relative to one another. The free portion of the bearing side of the first box-shaped part 2 forms the bearing surface 4 that interacts with the snap-fit members 7 on the second box-shaped part 3 for clamping panel 9 between them, and the free portion of the bearing side of the second box-shaped part 3 forms the bearing surface 5 that interacts with the snap-fit members 6 on the first box-shaped part 2 for clamping panel 8 between them.

FIG. 3 shows the fixing element partially exposed, as a result of which it is apparent that this is not a solid element. This is desirable from the standpoint of production technology and in addition results in a saving of material.

On assembly, box-shaped part 3 is, for example, pushed into cut-out 11 in panel 9, the snap-fit members 7 then first spring inwards and after passing through panel 9 these spring outwards once more and thus secure the panel between these snap-fit members 7 and the bearing surfaces 4. Obviously, in this case as well, the distance between the respective snap-fit members and bearing surfaces is matched to the thickness of the panel to be securely clamped for producing a joint with essentially no play. Because bearing surfaces 5 and 4 lie in the same plane, after assembly bearing surface 5 is located in the same plane as that side of panel 9 that is braced against surface 4 and box-shaped part 2 protrudes on said side, so that a second panel can be securely clicked onto it.

Figure 4:
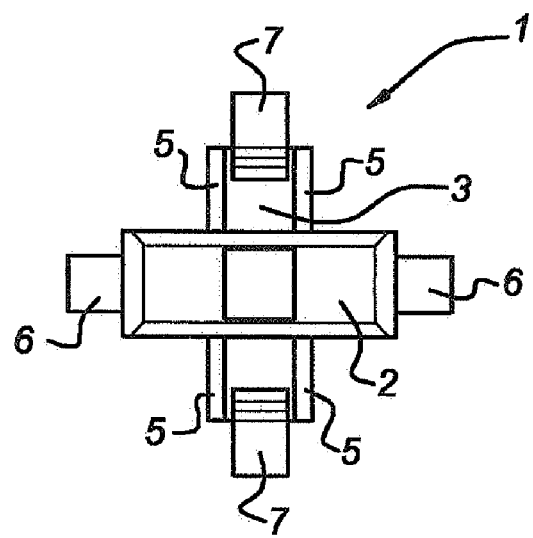
FIG. 4 is a plan view of the fixing element in FIGS. 2 and 3.

Because both insertion ends 12, 13 are made the same in this embodiment, it makes no difference which end is pushed into a panel first. This simplifies assembly. FIG. 4 shows clearly that the box-shaped parts 2, 3 are rotated 90° relative to one another in the embodiment shown.

Figure 5:
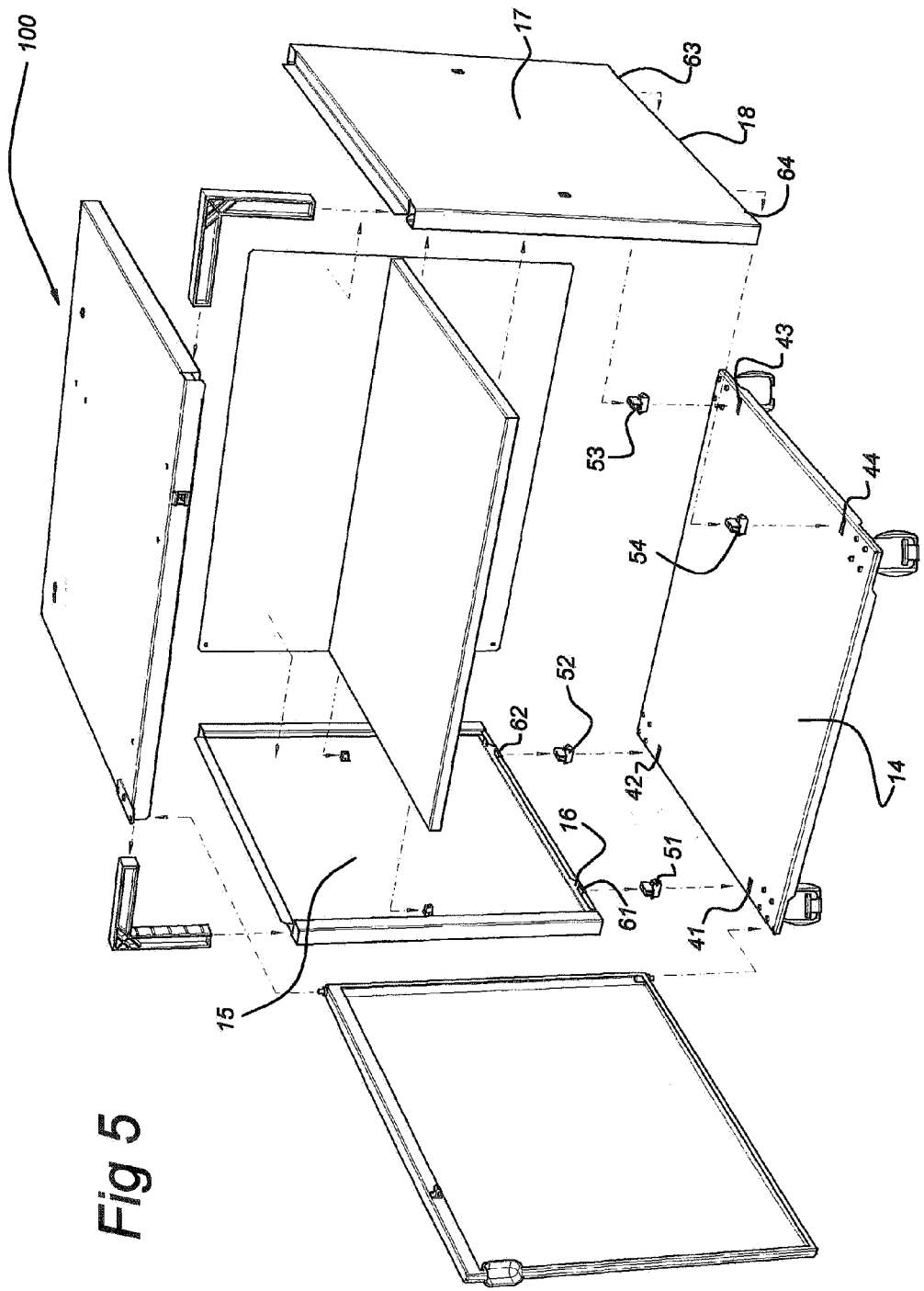
FIG. 5 is an exploded perspective view of a cabinet with panels that are fixed to one another with a fixing element according to the invention.
Figure 6:
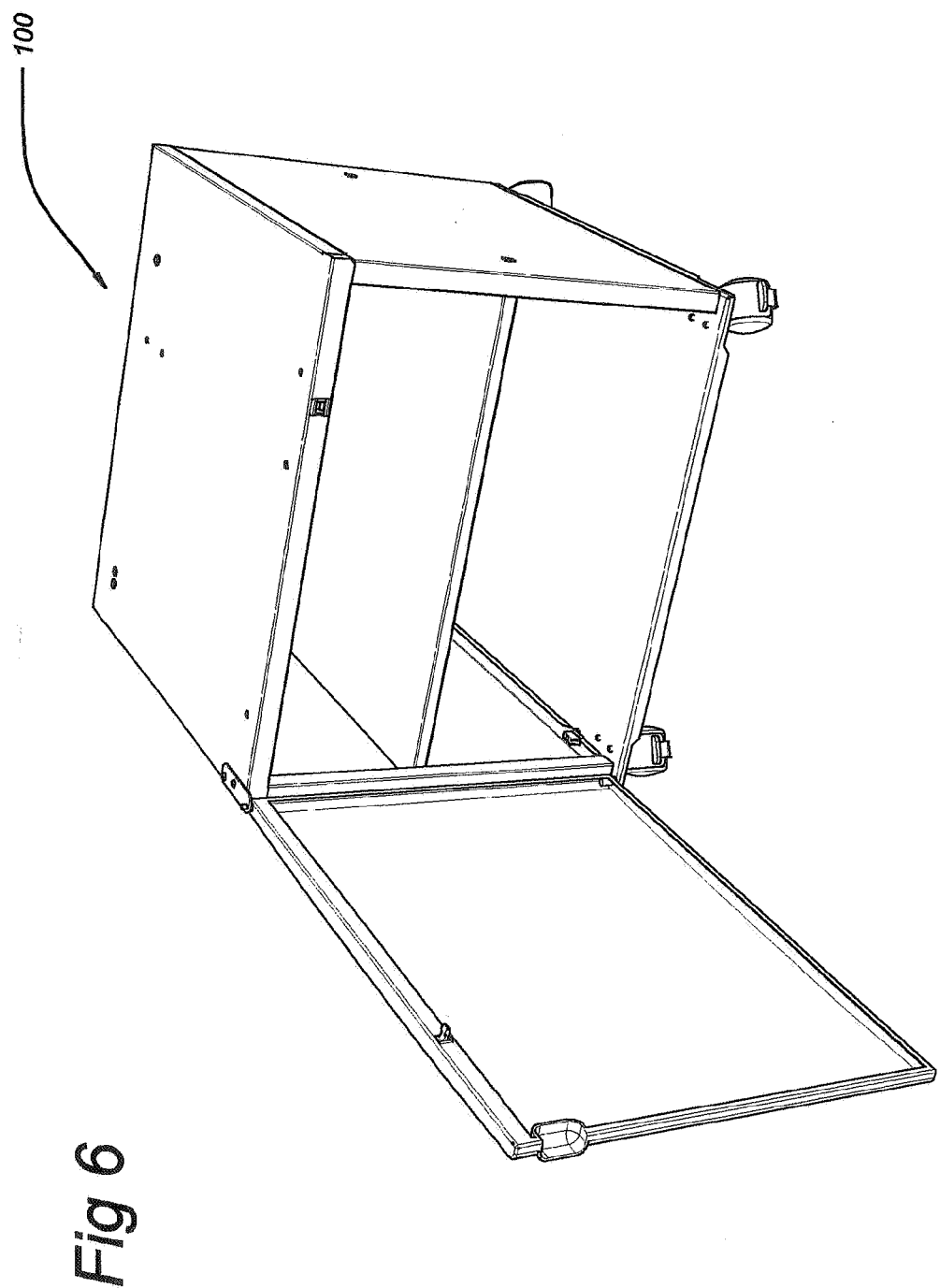
FIG. 6 is a perspective view of the cabinet in FIG. 5 in assembled state.

FIG. 5 shows a cabinet 100 according to the invention having panels 14, 15, 17 that are fixed by means of fixing elements 51-54 according to the invention. The embodiment shown comprises a base panel 14 with a first set of cut-outs 41, 42 on a first side for accommodating a first set of fixing elements 51, 52 and a second set of cut-outs 43, 44 on an opposing side for accommodating a second set of fixing elements 53, 54, as well as a first side panel 15 with an edge 16 folded over at a right angle with cut-outs 61, 62 for accommodating the first set of fixing elements 51, 52 therein and a second side panel 17 with an edge 18 folded over at right angles with cut-outs 63, 64 for accommodating the second set of fixing elements 53, 54 therein. Lastly, FIG. 6 shows this cabinet in assembled state.

The invention claimed is:

1. A fixing element fixing a first and second panel to one another, said fixing element comprising:
a body having opposing first and second insertion ends along a longitudinal axis of said fixing element and facing away from one another for insertion in a complementary cut-out in each panel;
a radially extending first body portion at said first insertion end having a first bearing surface defined by a first radially extending shoulder of said first body portion, and a first snap-fit projection portion radially projecting from said first shoulder between said first bearing surface and said first insertion end for snap-fitting within said complementary cut-out of said first panel;
a radially extending second body portion at said second insertion end having a second bearing surface defined by a second radially extending shoulder of said second body portion, and a second snap-fit projection portion radially projecting from said second shoulder between said second bearing surface and said second insertion end for snap-fitting within said complementary cut-out of said second panel;
said first and second body portions being connected along said longitudinal axis at said first and second bearing surfaces;
said second bearing surface facing in a first longitudinal direction for clamping said first panel between said second bearing surface and said first snap-fit projection portion, and said first bearing surface facing in a second longitudinal direction, opposite said first longitudinal direction, for clamping said second panel between said first bearing surface and said second snap-fit projection portion; and
wherein said first and second bearing surfaces lie in the same plane and said first and second shoulders radially extend from said longitudinal axis in angularly offset positions with respect to each other, so that said first and second panels are fixed to one another with said fixing element and are in direct contact with one another.

2. The fixing element of claim 1, wherein said first and second body portions comprise respective first and second box-shaped parts joined to one another at said first and second bearing surfaces,
wherein a free portion of said first box-shaped part forms said first shoulder and wherein a free portion of said second box-shaped part forms said second shoulder.

3. The fixing element of claim 2, wherein said first and second box-shaped parts are rotated 90 degrees relative to one another.

4. The fixing element of claim 1, wherein said fixing element is a single piece.

5. The fixing element of claim 1, wherein said fixing element is made by injection molding.

6. The fixing element of claim 1, wherein said fixing element is made of polyamide.

7. A cabinet comprising panels fixed together by means of at least one fixing element fixing a first and second panel to one another, each said fixing element comprising:
a body having opposing first and second insertion ends along a longitudinal axis of said fixing element and facing away from one another for insertion in a complementary cut-out in each panel;
a radially extending first body portion at said first insertion end having a first bearing surface defined by a first radially extending shoulder of said first body portion, and a first snap-fit projection portion radially projecting from said first shoulder between said first bearing surface and said first insertion end for snap-fitting within said complementary cut-out of said first panel;
a radially extending second body portion at said second insertion end having a second bearing surface defined by a second radially extending shoulder of said second body portion, and a second snap-fit projection portion radially projecting from said second shoulder between said second bearing surface and said second insertion end for snap-fitting within said complementary cut-out of said second panel;
said first and second body portions being connected along said longitudinal axis at said first and second bearing surfaces;
said second bearing surface facing in a first longitudinal direction for clamping said first panel between said second bearing surface and said first snap-fit projection portion, and said first bearing surface facing in a second longitudinal direction, opposite said first longitudinal direction, for clamping said second panel between said first bearing surface and said second snap-fit projection portion; and wherein said first and second bearing surfaces lie in the same plane and said first and second shoulders radially extend from said longitudinal axis in angularly offset positions with respect to each other, so that said first and second panels are fixed to one another with said fixing element and are in direct contact with one another.

8. The cabinet of claim 7, further comprising a base panel with a first set of cut-outs on a first side for accommodating a first set of said fixing elements and a second set of cut-outs on an opposing side for accommodating a second set of said fixing elements, a first side panel with an edge folded over at a right angle with cut-outs for accommodating said first set of said fixing elements therein, and a second side panel with an edge folded over at a right angle with cut-outs for accommodating said second set of said fixing elements therein.

* * * * *